United States Patent
Regef

(10) Patent No.: US 11,060,944 B2
(45) Date of Patent: Jul. 13, 2021

(54) LEAK DETECTION INSTALLATION, METHOD, USAGE AND CORRESPONDING COMPUTER PROGRAM STORAGE MEANS

(71) Applicant: ATEQ, Les Clayes sous Bois (FR)

(72) Inventor: Jean Luc Regef, Taipei (TW)

(73) Assignee: ATEQ, Les Clayes sous Bois (FR)

( * ) Notice: Subject to any disclaimer, the term of this patent is extended or adjusted under 35 U.S.C. 154(b) by 187 days.

(21) Appl. No.: 16/406,073

(22) Filed: May 8, 2019

(65) Prior Publication Data

US 2019/0346336 A1   Nov. 14, 2019

(30) Foreign Application Priority Data

May 9, 2018   (FR) ........................................ 1853969

(51) Int. Cl.
*G01M 3/32*       (2006.01)
*G01M 3/04*       (2006.01)

(52) U.S. Cl.
CPC .............. *G01M 3/32* (2013.01); *G01M 3/04* (2013.01)

(58) Field of Classification Search
CPC ........ G01M 3/04; G01M 3/027; G01M 3/202; G01M 3/227; G01M 3/229; G01M 3/32; G01M 3/3281
See application file for complete search history.

(56) References Cited

U.S. PATENT DOCUMENTS

| | | | |
|---|---|---|---|
| 3,355,932 A | 12/1967 | Mulligan | |
| 3,762,212 A * | 10/1973 | Morley | G01M 3/202 73/40.7 |
| 5,307,669 A * | 5/1994 | Nishio | G01M 3/2869 73/40 |
| 5,728,929 A * | 3/1998 | Gevaud | G01M 3/202 73/19.12 |
| 5,939,619 A * | 8/1999 | Achter | G01M 3/229 73/40.7 |
| 6,082,184 A | 7/2000 | Lehmann | |
| 6,460,405 B1 * | 10/2002 | Mayer | G01M 3/20 73/40.7 |
| 7,131,316 B2 | 11/2006 | Doehla et al. | |
| 7,905,132 B1 * | 3/2011 | Chamberlain | G01M 3/205 73/40.7 |
| 2009/0164148 A1 | 6/2009 | Shinoda | |
| 2016/0349138 A1 * | 12/2016 | Fu | B65B 29/022 |

FOREIGN PATENT DOCUMENTS

TW   201142268     *  1/2011  ............. G01N 15/08
WO   2011132391 A1   10/2011

OTHER PUBLICATIONS

Machine translation of TW201142268 (Year: 2011).*

* cited by examiner

*Primary Examiner* — Natalie Huls
(74) *Attorney, Agent, or Firm* — Young Basile Hanlon & MacFarlane, P.C.

(57) ABSTRACT

A leak detection device and method for use in testing a wall with selective gas/liquid permeability. The wall is sealed inside a containment including an injection chamber and a test chamber. The injection chamber is in communication with an injection and pressurization source and the test chamber is in communication with a vacuum production device. A vaporized liquid detector is in communication with the test chamber operable to detect and/or measure a parameter related to a quantity of liquid vapor or a variation in the quantity of liquid vapor which is indicative of a leak condition through the wall.

19 Claims, 4 Drawing Sheets

| # | Test phase | Tap 57 (test liquid inlet) | Valve 54 (test liquid inlet) | Tap 58 (air 4 bars) | Valve 56 (air 4 bars) | Valve 30 (vacuum pump) | F28LPV (measurement) | Valve 55 (discharge) |
|---|---|---|---|---|---|---|---|---|
| 1 | Water injection | O | O | O | C | C | C | O |
| 2 | Create vacuum | O | O | O | C | O | C | C |
| 3 | Pressurise | C | C | O | O | O | C | C |
| 4 | Stabilisation period | C | C | O | O | O | C | C |
| 5 | Measurement | C | C | O | O | C | O | C |
| 6 | Stop pressure and drain | C | C | O | O | O | C | O |

Fig. 7

LEAK DETECTION INSTALLATION, METHOD, USAGE AND CORRESPONDING COMPUTER PROGRAM STORAGE MEANS

CROSS-REFERENCE TO RELATED APPLICATIONS

This application claims priority benefit to French patent application serial number 1853969 filed May 9, 2018 the entire contents of which is incorporated herein by reference.

FIELD OF INVENTION

The invention relates to the detection of leaks in walls and/or hollow parts such as cases, boxes or any other part or element of an industrial or consumer object, for example although these examples are not exhaustive, for which leak tightness must be tested.

BACKGROUND

Several techniques are known in the context of leak tightness tests of walls or cases with selective leak tightness, applicable particularly to diving watches for which the case includes openings provided for example with an external water tight wall to prevent water from infiltrating into the watch and deteriorating the internal mechanism. Such walls must be water tight up to a certain depth defined according to precise characteristics in this subject. (for example see ISO standard 6425 for diving watches).

These diving watches also include such leak tight external walls that have selective air/water permeability, in other words are water tight while remaining permeable to air.

This type of membrane with selective permeability allows particles of some substances to pass, while preventing others. For example, selectivity may act on the size of particles (for example like a microscopic sieve), or through a physical and/or chemical attraction or repulsion force, or the geometry of molecules, the membrane having sufficiently large pores to allow the passage of gas molecules but too small for the pressure to overcome the surface tension force of the liquid (typically with diameters of a few nanometres).

Known techniques for testing the leak tightness of walls with selective leak tightness include for example information in U.S. Pat. No. 7,131,316 (to test the impermeability of clothes such as gloves). Gloves to be tested are connected to air pumps that blow air inside the gloves until they reach a determined internal pressure. If they reach the determined pressure, the glove is water tight and is validated or approved. Otherwise, the glove is refused or rejected.

However this type of test, applicable to inflatable and deformable fabrics with imprecise characteristics, remains approximate and cannot be used to make measurements or even to detect very small leaks.

Another known method consists of plugging elements porous to air and only checking the leak tightness of its assembly and other elements of the product.

However, a disadvantage of this system is that in this case, all elements have been tested except for the porous element itself.

In the field of watch cases, a frequently used leak tightness test is the "cold water drop" test that consists of holding the watch case under pressurized water for a given time, and then taking it out of the water and applying a cold water drop on the watch glass and observing whether or not condensation appears under the glass. If condensation forms under the glass, the watch has a leak tightness problem.

Such a technique assumes specific working conditions and makes it simple to obtain a binary result, in other words to determine whether or not the watch is leak tight, without obtaining any further information about the degree of leak tightness or its measurement, so that it cannot be used for many cases of selective leak tightness measurements.

Furthermore, such a technique requires that the glass is transparent, which is not always the case.

U.S. Pat. No. 3,355,932 describes an instrument and a method of testing the impermeability of watches to water. The method described can be used to test the leak tightness of watches using various methods of immersing the watch case in a gaseous atmosphere with a difference in pressure inside and outside the case, instead of immersing in a liquid to prevent risks of deterioration.

The device, composed of a circuit comprising two reservoirs connected firstly to the containment containing the case to be tested, and secondly to the interior of the case, can be used to perform several types of test, either in a gaseous atmosphere (with instantaneous or delayed detection of differential pressure), or in the presence of water, but by organizing precautionary pressurization cycles that only enable very limited water ingress into the case, so that traces of water can be identified with the naked eye and to determine the position of any leaks.

However, this technique cannot be used to make a precise leakage measurement.

A water tightness test device is also described in United Stated Patent Application Publication No. US 2009164148 applicable to testing the water tightness of the acoustic interface (microphone and/or loudspeaker) of a portable telephone case. The required leak tightness in this type of case is obtained using a membrane with selective leak tightness. The water tightness test is made by checking tightness to an air flow, by measuring the air leakage flow rate, using correspondence tables between the measured air flow and the corresponding real water tightness measured in reference objects. Water tightness is presumed when the air leakage rate is less than a predetermined threshold.

However this test system remains imprecise, subject to problems and assumes that the reference objects used to calibrate the air leakage threshold have characteristics similar to the walls tested, which is not a reliable working hypothesis and is not applicable in many situations.

Furthermore, it does not enable any real direct or even indirect measurement of water tightness.

In the field of detection of small leaks, there are various known techniques, particularly by tracer gas for detection and localization and/or measurement.

Thus, in particular it is known how to detect very small leaks by creating a very high vacuum inside a part to be tested and then detecting molecules of tracer gas that were able to penetrate into the part.

A number of techniques consist of sealing the part to be tested, placing it inside a containment, pressurising the part and leaving the containment at atmospheric pressure and then waiting for a sufficiently long time to be able to detect the presence of a tracer gas, if any, using a detector sensitive to this gas.

Such techniques, said to be accumulation techniques, have the disadvantage of taking a long time to implement which can be incompatible with production rates of parts to be tested. Otherwise, the concentration of tracer gas after accumulation can be too low to be detected by detectors available on the market.

Furthermore, if the wall to be tested is permeable to this type of gas, this gas will necessarily leak through the wall, possibly very quickly, and the test will not be reliable and may be completely unsuitable.

Therefore, there is a need for improved leak detection methods, or methods different from prior art, for the fast and reliable detection of small liquid leaks, and that can be used in the case of a leak test on walls or hollow parts that have selective permeability to water (or other liquids), but not necessarily to air and/or other gases, under specific conditions.

SUMMARY

The invention relates to the detection of such leaks in walls and/or parts that have selective leak tightness, typically walls and/or parts that must be tight to a liquid, such as water under specific conditions (for example, at least up to a given water pressure), but permeable to some gases such as air.

Examples of applications of the invention include particularly quality control in the fabrication of leak tight parts that are designed to function in a wet or aqueous medium, for example submerged in water under specific circumstances.

A typical example is watch cases for divers, which require perfect water tightness under specific conditions, while enabling gaseous exchanges to avoid or limit internal condensation or other phenomena as a function of usage cycles.

Another example is portable telephone cases, or any other type of portable electronic object (camera, etc.), that must be water tight, particularly to resist use in the rain, and be water resistant under specific conditions, such as a telephone being dropped into a puddle of water.

The purpose of this invention is to overcome some of the disadvantages of prior art.

One of the purposes of the invention is to detect and measure small water leaks in the walls and hollow parts for which good impermeability to water is necessary under some usage conditions.

Another purpose of the invention is to provide a device and a method applicable to walls and hollow parts with selective leak tightness, in other words permeable to air and/or a gas and impermeable to water and/or a liquid.

Another purpose of the invention is to provide a device and a method of leak detection providing good measurement precision so that even very small leak tightness problems can be detected.

These objectives, and others that will become apparent in the following description, are achieved by means of a leak detection installation applicable to a wall with selective gas/liquid permeability, using a test liquid circuit, in which said wall is sealed between two test chambers, namely:

a first injection chamber formed upstream from said wall, said first injection chamber being connected to injection and pressurization means of the test liquid, installed in said test liquid circuit;

a second test chamber formed downstream from said wall, said second test chamber being connected to vacuum production means downstream from said test chamber;

said second test chamber also being connected to means of detection of vaporized liquid in said second test chamber, said means being used to detect and/or measure at least one parameter related to a quantity of liquid vapour (vapor) and/or a variation of the quantity of liquid vapor in said second test chamber, and/or a liquid vapor flow, said parameter being indicative of and/or representative of a leak situation or condition through said wall.

The exemplary test liquid is water in the simplest and most frequent usage of the invention.

Advantageously, said parameter related to a quantity of test liquid vapor and/or a variation of the quantity of liquid vapor belongs to the group comprising:
 a parameter detecting the presence of vaporized liquid;
 a parameter indicating the liquid vapor flow rate;
 a parameter indicating pressure variations associated with the presence of vaporized liquid, and
 a parameter indicating rates of pressure variations associated with the existence and/or leakage flow rate of liquid through the wall.

In one preferred embodiment or example, said parameter consists of a measurement of the pressure variation, and said liquid vapor detection and measurement means or device in said second test chamber are composed of means or a device of measuring the pressure and/or the pressure variation in said second test chamber.

According to another preferred embodiment or example of the invention, said parameter consists of a measurement of the flow rate, and said liquid vapor detection and measurement means in said second test chamber are composed of means or a device of measuring the flow rate of liquid vapor originating from said second test chamber.

In a first embodiment of the invention, said wall being the external wall of a hollow part, said injection chamber being formed by the inside of said hollow part, and said test chamber is formed by the inside of a containment in which said hollow part is sealed.

In a second embodiment, said wall being the external wall of a hollow part, said injection chamber being formed by the inside of said hollow part, and said test chamber is formed by the inside of a containment in which said hollow part is sealed.

The installation device according to the invention advantageously has the following characteristics:
 the injection chamber communicates with a test liquid supply circuit through a sealed channel, said test liquid supply circuit comprising a liquid supply reservoir;
 said liquid supply circuit comprises a filter placed between said liquid supply reservoir and said injection chamber;
 the part of said liquid circulation circuit located downstream from said containment comprises a vacuum pump and a liquid discharge reservoir;
 said vacuum production means or device lowers the pressure in the test chamber to a pressure P2 less than the partial pressure of the liquid vapour (vapor) used at the test temperature;
 said pressurization means or device pressurises the test liquid in the injection chamber to a pressure P1 higher than atmospheric pressure, preferably higher than four (4) bars relative, and said vacuum production means lowers the pressure in the test chamber to a pressure P2 less than 2 kPa absolute, and preferably less than 1 kPa;
 the installation device comprises a unit to control and test successive steps in a test procedure, controlling a plurality of liquid flow regulation valves.

The invention also relates to a method of detecting a leak in a wall with selective gas/liquid permeability, characterised in that it comprises the following steps:
 sealing said wall between two test chambers formed inside a containment, namely a first injection chamber and a second test chamber;

filling said injection chamber formed upstream from said wall with a volume of test liquid brought to a pressure P1 by said test liquid pressurization means;

generating by a vacuum production device a pressure level P2 in said test chamber such that said pressure P1 in said injection chamber is higher than the pressure P2 in said test chamber and that any liquid leak from said injection chamber to said test chamber causes the leakage liquid to evaporate in said test chamber;

searching or monitoring for the presence of liquid vapour originating from said injection chamber into said test chamber by detecting and/or measuring at least one parameter related to a quantity of liquid vapour and/or a variation of the quantity of liquid vapour in said second test chamber, and/or a liquid vapour flow from said containment to the device for pressurization at pressure P2, said parameter being indicative of and/or representative of a leak situation or condition through said wall.

If the wall forms the envelope of a hollow part, the method according to the invention preferably comprises the following steps:

sealing said hollow part forming said injection chamber created inside a containment forming said test chamber;

filling said injection chamber with a volume F of liquid pressurized to pressure P1;

generating through a vacuum production device a pressure level P2 in said containment such that said pressure P1 inside said hollow part is higher than the pressure P2 in said containment and that any liquid leak from said hollow part to said containment causes the leakage liquid to evaporate in said containment;

searching or monitoring for the presence of liquid vapour originating from said hollow part into said chamber by detecting and/or measuring at least one parameter related to a quantity of liquid vapour and/or a variation of the quantity of liquid vapour in said second test chamber, and/or a liquid vapour flow from said containment to the device for pressurization at P2, said parameter being indicative of and/or representative of a leak situation or condition through said wall.

In both cases, the method comprises all or some of the following phases or steps:

said test liquid injection and pressurization phase into said first injection chamber;

a vacuum production phase in said second test chamber;

an optional stabilisation phase;

a phase to search or monitor for an increase in liquid vapour in the test chamber, by detection and/or measurement of said parameter; and/or a test liquid pressure reduction and evacuation phase.

Advantageously, the method according to an example of the invention also comprises a bleed phase or step and/or a calibration phase or step before said injection and pressurization phase of the test liquid in said first injection chamber.

In one particular embodiment of the method according to the invention, said test liquid injection and pressurization phase in said first injection chamber is made in two steps, namely:

a first step filling the test liquid circuit to a first low injection pressure, in one example less than 0.2 bars relative, in another preferred example 0.05 bars relative, and evacuation of air in the filling circuit;

a second test liquid pressurization step to a second test pressure in one example higher than atmospheric pressure, and in a preferred example equal to 4 bars relative.

Advantageously, said vacuum production phase in said second test chamber consists of reducing the pressure in the test chamber to a pressure P2 less than the partial pressure of the liquid vapour used at the test temperature, in one example a pressure less than 2 kPa, and in a preferred example less than 1 kPa.

Preferably, said phase or step to search or monitor for an increase in the liquid vapour includes:

either a sub-step to measure the pressure variation P2 inside said test chamber;

or a sub-step to measure the liquid vapour flow passing from said containment to the device increasing the pressure to P2.

Advantageously, the exemplary method according to the invention uses water as the test liquid.

The invention also aims to cover an installation or device for making use of all or some of the characteristics of the method according to the invention, and possibly provided with test cycle control means or device that selectively activates all or some of the phases or steps of said method.

Another purpose of the invention consists of different specific uses of the method and/or the installation or device in question, namely in particular application of the method and/or the installation to wall tests comprising at least one orifice closed off by a membrane with selective permeability, typically a membrane composed of GORETEX®, made of ePTFE or an equivalent material.

In one indirect variant or alternate example, the principle of the invention can also consist of its application to cases in which the test liquid injection and pressurization phase is performed during a distinct preliminary step, before the test procedure, the hollow part being filled with liquid and sealed before the test procedure.

Finally, another purpose of the invention is a storage medium that can be read by a computer and that is not transient, storing a computer program comprising an instruction set that can be executed by a computer or a processor to implement the method according to the invention.

BRIEF DESCRIPTION OF THE DRAWINGS

The invention and its various advantages will be more easily understood after reading the following description of an illustrative and non-limitative embodiment of the invention and the appended drawings among which:

FIG. 7 is a table illustrating successive configurations of the principal valves in an installation according to the example shown in FIG. 2, during successive phases in the execution of a test method according to one example of the invention.

DETAILED DESCRIPTION

One example of the invention and possible variants or alternate examples will now be described with reference to FIGS. 1 to 5.

In the embodiment described, the wall described is a wall with selective air/water permeability.

However, the invention is not limited to walls with selective air/water permeability and can be applied to other walls with selective gas/liquid permeability.

It will also be noted that absolute pressure means the pressure relative to zero pressure in a vacuum. Relative pressure means pressure relative to the ambient barometric pressure at the time, in this case atmospheric pressure.

Figure 1:
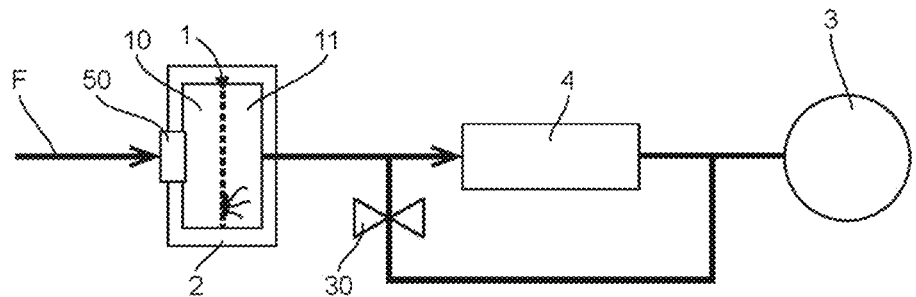
FIG. 1 is a simplified diagrammatic view of an installation or device according to one example of the invention.
Figure 2:
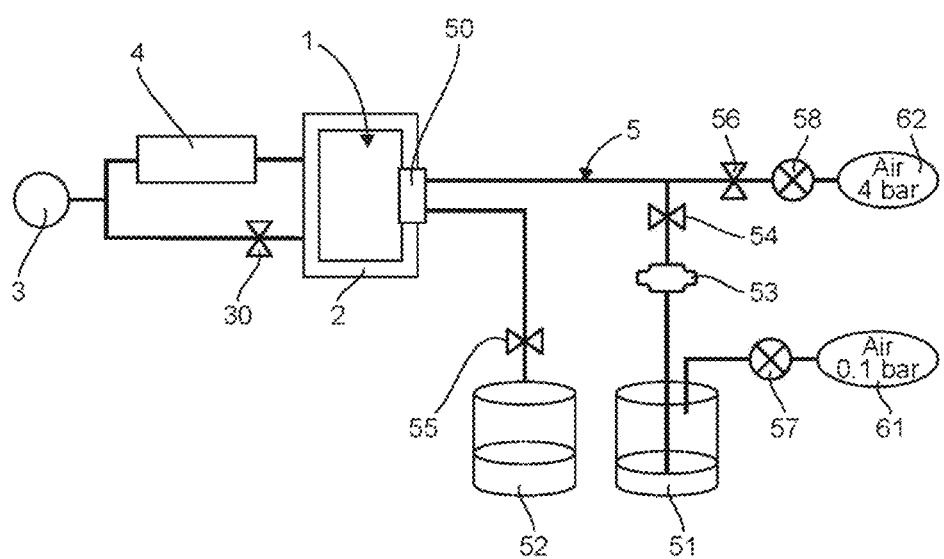
FIG. 2 is a complete diagrammatic view of an installation according to the example in FIG. 1.

FIGS. 1 and 2 illustrate a simplified embodiment or example of the installation or device for leak detection of a wall 1 with selective air/water permeability.

In the case in which the wall 1 is a hollow part, the injection chamber 10 is formed inside the hollow part while the test chamber 11 is formed inside a containment 2 in which the hollow part is sealed.

However, embodiments or alternate examples could be envisaged in which the test chamber is formed inside the hollow part while the injection chamber is formed inside a containment 2 in which the hollow part is sealed.

The wall 1 is preferably a wall with selective air/water permeability, impermeable to water, but permeable to air. During normal operation, such a wall thus does not allow the passage of water or, in the case of a hollow part, does not allow water to enter inside the hollow part to avoid deteriorating elements of this part. It also allows air inside the hollow part to leave so as to avoid condensation phenomena.

For example, in the case of a diving watch, the watch case must be water tight, at least up to a given depth (and therefore a given pressure) to avoid damaging the mechanism. However, the watch case must allow air to enter and/or leave so as to harmonise air temperature, pressure and composition conditions between the inside and the outside of the watch case, for example to prevent condensation from forming on the watch glass.

The first injection chamber 10 is formed upstream from the wall 1 while the second test chamber 11 is formed downstream from this wall 1.

Consequently, the wall 1 to be tested splits or spatially divides a containment 2 inside which it is placed or separated into two parts, with the first injection chamber on the upstream side and the second test chamber 11 on the downstream side.

The installation also comprises means of, or a device for, detecting vaporised (vaporized) water in the second test chamber 11.

These means or device are capable of at least one of detecting or measuring at least one parameter related to a quantity of water vapour (vapor) and/or a variation of the quantity of water vapour in the second test chamber.

Since this parameter is indicative and/or representative of a leak situation or condition through the wall, it gives an indication about whether or not the wall 1 is permeable.

Depending on the different embodiments, this parameter related to a quantity of test water vapour and/or a variation in the quantity of water vapour can be one of the parameters in the following group:

a parameter detecting the presence of vaporised water;
a parameter indicating pressure variations associated with the presence of vaporised water,
a parameter indicating the vaporised water flow rate, or
a parameter indicating rates of pressure variations associated with the existence of a water leak through the wall.

In the embodiment illustrated, this parameter is composed of a measurement of the pressure variation in the test chamber 11.

When using the leak detection method for wall 1, the wall 1 is sealed between two test chambers formed inside the containment 2, namely the first injection chamber 10 and the second test chamber 11.

When the wall 1 is a hollow part, the hollow part 1 forming the first injection chamber 10 is sealed, and is placed inside the containment 2 forming the second test chamber 11.

The injection chamber 10 formed upstream from said wall 1 is then filled with a volume F of test water brought to a pressure P1 by an injection and pressurization means or device 61, 62.

The injection and pressurization device 61, that in this example is a pressure conduit at 0.1 bars, is used to initialise the water circuit and to flush residual air in the circuit.

This conduit is connected to the water circuit through a valve 57 that may connect or disconnect this conduit to or from the circuit, depending on whether the valve is open or closed.

The first injection chamber 10 communicates with a water supply circuit 5 through a leak tight channel 50 passing through the containment 2 and opening up at the location of the first injection chamber 10, to bring the volume F of test water to the first injection chamber.

Assuming that the wall to be tested is a hollow part, the leak tight channel 50 passes through the containment 2 and opens up at the location of the hollow part 1.

As illustrated particularly in FIG. 2, the water supply circuit also comprises a water supply reservoir 51, that carries or provides test water inside the first injection chamber 10.

This water supply circuit also comprises a water discharge reservoir 52 that collects residual water from the circuit leaving the first injection chamber 10 through the water circuit outlet, at the time of the initialisation and drainage of the installation at the end of the test.

The test water used herein must not deteriorate the physical properties of the walls to be tested and also must not clog these walls.

For example, distilled water can be used, or at least water from which at least some minerals or organisms have been eliminated so as to prevent the effects of the leak measurement being minimised by accumulation, sedimentation and/or temporary blocking phenomena.

The water supply circuit 5 also comprises a filter 53 placed between the water supply reservoir 51 and the injection chamber 10, so that the test water does not contain any impurities that might disturb the test.

Finally, in this embodiment, the circuit comprises several valves 54, 55, 56, 57 and 58 placed close to the water supply reservoir 51, the water discharge reservoir 52, and an air inlet so that the water flow F circulating through the water supply circuit can be regulated. The circuit also comprises a valve 30.

The valve 55 is closed as soon as water is detected downstream of the valve. The valve 55 is also closed while the valve 56 that pressurises water, particularly through pressurization means 62, is open.

Therefore the test water is carried towards the injection chamber 10 through these variations or alternately described injection device or means and is then pressurized by a device or means, particularly of pressurization device 62, that increase the pressure to a pressure higher than 1 bar relative, and preferably higher than 4 bars relative.

It should be noted the volume of water to be drained in the case of a large water leak will be lower if the volume of water inside the circuit is lower. Consequently, it is preferable to have a minimum volume of water in the water circuit, so that test cycles are as short as possible and particularly if the instrument is designed to test objects in a fabrication or test line.

Then, a pressure P2 is created inside the second test chamber 11 so that the pressure P1 inside the first injection chamber 10 is higher than the pressure P2 inside the second test chamber 11, and that any water leak from the injection chamber 10 to said test chamber 11 causes leakage water to evaporate inside the test chamber 11, through means or vacuum production device 3 for producing a sufficiently high vacuum to guarantee total evaporation of water downstream from the second test chamber 11.

According to the illustrated embodiment, these vacuum production means or device are in the form of an air vacuum pump 3.

This air vacuum pump 3 can create a pressure P2 inside the test chamber 11 less than 2 kPa absolute, preferably less than 1 kPa (these indicative values being given for test conditions for which the ambient temperature is about 20° C.). Such a pressure, corresponding to a high vacuum, makes it possible to better detect the presence of water in the test chamber, as will be seen below.

According to the principle of the invention, since the pressure P1 in the first injection chamber 10 is very much higher than the pressure P2 in the containment 2 test chamber 11 that is close to a vacuum, any leakage water will escape from the part and the pressure close to a vacuum will enable this escaping water to evaporate as it passes from the first injection chamber 10 to the second injection chamber 11 through the wall 1.

Evaporation of leakage water is the direct result of the second test chamber 11 being under a high vacuum, preferably less than 1 kPa, under temperature conditions in which this pressure is less than or equal to the evaporation pressure of water.

Figure 4:
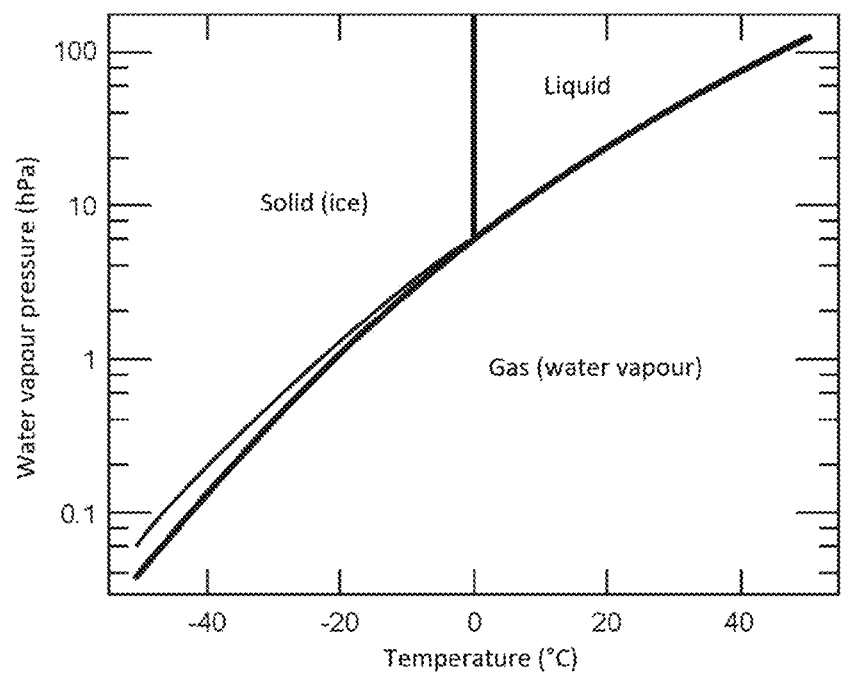
FIG. 4 is a phase state diagram of water as a function of the temperature and pressure.

The concept of a sufficiently high vacuum to guarantee complete evaporation of the water is described with reference to FIG. 4 presenting the phase state diagram of water as a function of the temperature and the pressure.

The physical evaporation phenomenon of the test liquid is directly related to the partial pressure of the liquid vapour used at the test temperature (or in other words, a vacuum pressure such that the liquid is in the gaseous phase at the test temperature).

It can be seen in FIG. 4 that at a temperature of 20 degrees Celsius, the evaporation pressure of water is about 20 hPa, which is 2 kPa.

To guarantee that the water evaporates completely, it would also be possible to take a "safety margin" from the evaporation pressure by producing a vacuum pressure equal to approximately 15 hPa, which is 1.5 kPa.

The next step then consists of searching or monitoring for the presence of water in the second test chamber 11 by detecting and/or measuring the water vapour in the second test chamber 11.

In the embodiment illustrated in the drawings, the search for water vapour is made by measuring the variation in the pressure P2 inside the second test chamber 11.

This measurement of the variation of the pressure P2 inside the second test chamber 11 is made by a vaporized liquid detector device 4. For example, one suitable vaporized liquid detector device and/or pressure measurement device or means 4 is the ATEQ F28LPV® instrument sold by ATEQ the assignee of the present invention.

It should be noted that during this pressure measurement, it is preferable if the test chamber 11 is closed (valve 30) so that a precise measurement of the pressure variation can be made.

However, it would be possible to use other means of measuring the increase of water vapour in the test chamber, for example by means of a flow meter.

In a variant or alternate embodiment or example of the installation according to the invention, said means of detecting and measuring the presence of water vapour in said second test chamber 11 consist of means 4 of measuring the flow of water vapour out of said second test chamber 11 and towards the vacuum pump 3 designed to bring the pressure inside the test chamber 11 to pressure P2. In this case, the test chamber 11 is not closed but remains in liaison with the vacuum creation system: the pressure does not increase as in the preceding example, it is maintained and therefore incoming water vapour results in an extracted flow and not a pressure increase.

In the exemplary device 4, the ATEQ F28LPV® measurement instrument has a resolution of one tenth of a Pascal.

This vaporized liquid detector device or pressure measurement means 4/4A also has a remote user interface so that a PC can be used to obtain various information about the pressure measurement and the variation of the pressure measurement.

Such a characteristic can significantly improve the sensitivity of the detection of water leaks, even very small leaks, due to the possibility of making precise measurements of pressure variations of the order of a few tenths of Pascals.

A small variation in the pressure, for example of the order of a few Pascals, represents a very small leak at the wall 1.

To illustrate this, 1 mol of water evaporates to give 24 sL (standard litres, namely litres at standard atmospheric pressure) of water vapour. Consequently, a water leak with a flow of 300 µg/min represents a vapour leak of 0.4 sccm (standard cubic centimetres per minute). Thus, with a test on a volume of 10 cc, this represents a pressure variation equal to 67 Pascals per second.

Therefore the measurement of relative humidity in the second test chamber 11 by measuring the variation in the pressure P2 can detect vary small variations in this pressure P2, measured in Pascals, and thus determine whether or not the wall 1 is leak tight based on the detection of leaks not larger than a few tenths of micrograms of water per minute.

Considering X as being the value of the molar mass of water in grams per mol, it is found that the mole rate do passing through the leak in time dt is equal to:

$$\frac{dn}{dt} = \frac{dm}{dt} * \frac{1}{X}$$

In which dm corresponds to the mass of water that passed through the leak in time dt.

Assuming that water vapour is an ideal gas, the ideal gas law can be applied. Therefore this corresponds to a pressure increase dP equal to:

$$VdP = dn * RT$$

-continued $$\Leftrightarrow \frac{dP}{dt} = \frac{dn}{dt} * \frac{RT}{V}$$

$$\Leftrightarrow \frac{dm}{dt} = X * \frac{V}{RT} * \frac{dP}{dt}$$

where R is equal to 8.314 kg·m2·s-2·K-1·mol-1 and is equal to the ideal gas constant, where X is the value in grams of the mass of a mole of water, namely 18 g·mol-1.

The result obtained is as follows for a reference temperature of 25 degrees C., $$\frac{dm}{dt} = 0.44 * V * \frac{dP}{dt}$$

where V is the free volume of the containment in cm3, in other words the total volume of the containment minus the volume occupied by the hollow part 1.

Thus, with a given volume inside the test chamber 11, there is a direct relation between the pressure difference inside the second test chamber 11 and the mass of water added during the waiting time, corresponding to the mass of water that passed through the wall 1 due to the leak.

Before using the installation for a real test, it is useful to perform a calibration phase on the installation.

For this calibration phase, the procedure may, for example, be the same as for detection of a leak through a wall, but by injecting air instead of test water.

Figure 3:
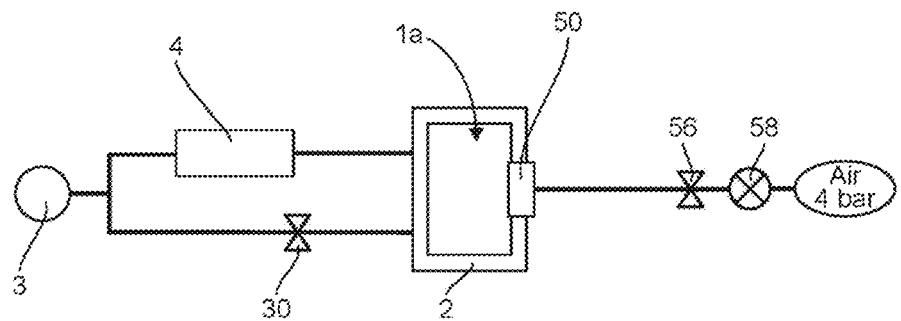
FIG. 3 is a diagrammatic view of an installation according to the example in FIG. 1, during a calibration phase.

FIG. 3 diagrammatically shows a specific setup of the installation in the calibration step.

A "dummy" test piece is used for this calibration step, instead of the wall to be tested.

Such "dummy" parts may, for example, be machined dummy parts with or without a standard orifice.

The "dummy" part is placed in the test containment forming the test chamber and the tap 58 is opened to allow air to enter the injection chamber instead of test water. The valves 56, 30 and the vaporized liquid detector device or pressure measurement instrument 4 are also opened, so as to calibrate the installation.

Thus, the test volume of the installation can be deduced by controlling the air pressure at the inlet and measuring the pressure increase at the outlet, knowing the flow rate due to the calibration certificate of the standard orifice.

The volume thus calibrated is then used in the formulas described below to measure the water leak:

$$\frac{dm}{dt} = 0.44 * V * \frac{dP}{dt}$$

Thus, by measuring the pressure variation in the second test chamber, the installation according to the invention as illustrated by the description of the embodiment given above can be used to detect a presence of water vapour in this second chamber originating from the first injection chamber, and thus to detect and measure a potential leak through the tested wall and/or part. Consequently, the invention can be used to test the impermeability of the wall to water.

The invention can also be used to detect leaks of liquids other than water for walls with selective permeability other than gas/water. In this case, such a method of detecting and measuring leaks would not include the step to measure the quantity of water vapour in the second test chamber, but would rather be a step to measure the quantity of gas related to the fluid for which the wall must be permeable, such detection also being possible by measuring the pressure change inside the second test chamber.

Thus, the method and the installation according to the invention can be used in an application to tests of walls with at least one orifice closed off by a membrane with selective permeability.

According to one preferred embodiment, the wall with selective permeability is composed of GORETEX®, ePTFE or an equivalent material.

It will be noted that in one indirect variant or alternate example, the invention can also be applied to the tightness test of products for which the walls must be tight even to air or another gas. In this case, detection and/or measurement of the increase in liquid vapour in the test chamber is representative of the general leak tightness of the tested wall. This type of use can be adopted for example in the case of parts filled with a liquid for which leak tightness of the walls is to be tested.

A preferred functional cycle of the test method will now be presented with reference to FIG. 7.

The table in FIG. 7 presents the state of the different components of the test circuit (taps, valves, measurement instrument) at the different steps of the test procedure. The letter "O" means that the tap or the valve is open (or that the instrument is functioning) and the letter "C" means that the tap or the valve is closed (or that the instrument is not in use).

As described above, the leak detection method advantageously includes all or some of the following steps or phases:
- a test water injection and pressurization phase into said first injection chamber 10;
- a vacuum production phase in said second test chamber 11;
- a stabilisation phase;
- a phase to search or monitor for the presence or an increase in the water vapour in the test chamber 11, by detection and/or measurement of said pressure increase parameter, or
- a test water pressure reduction and evacuation phase.

Before the injection and pressurization phase for the first leak detection test, it may be necessary to make use of a calibration phase so as to calibrate the installation properly, as described above.

The test cycle includes a (#1) test water injection and pressurization phase into the first injection chamber 10.

This test water injection and pressurization phase into the first injection chamber 10 is made in two steps, namely:
- a first step to inject test water and evacuate air, at a first injection pressure;
- a second water pressurization step at a second test pressure.

During the first test water injection step, the taps or valves 57, 58 and the clean water inlet valve 54 into the test water circuit 5 and the valve 55, allowing air to be evacuated through the discharge reservoir, are in the open position. The valves 30, 56 and the vaporized liquid detector device or measurement instrument 4 are closed.

The method then includes a phase (#2) in which the test containment is put under a vacuum. The valve 30 is open, such that the vacuum production means 3 pressurises the second test chamber 11. If the target pressure cannot be reached, there must be a large water leak and the system goes onto the last phase to evacuate water directly.

It should be noted that this phase creating a vacuum in the test containment could also be executed before the first test water injection step.

The second water pressurization phase (#3) to a second test pressure then takes place, also corresponding to pressurization of the first injection chamber 10. During this second step, the tap 57 and the valve 54 allowing clean water to enter the supply circuit 5, and the bleed valve 55 are closed while the valve 56 for pressurization of the injection chamber is open.

A stabilisation phase (#4) may then be carried out. During this phase, the different elements of the installation remain the same as in the preceding phase. In the stabilisation phase, the system can come into equilibrium and leaks can enter a steady state so that a reliable measurement of the pressure variation rate and therefore the "size" of the leak can be made (see below).

Incidentally, it should be noted that during the actual test phase, the test liquid is cooled as it changes to the gaseous phase, which lowers the temperature of the test medium below ambient temperature, and this may have to be taken into account for the measurement operation.

The test then comprises a phase (#5) to measure the rate of variation of water vapour by a measurement of the pressure variation in the second test chamber 11. In this phase, since the different required pressures are reached, the valve 30 connecting the vacuum production means 3 to the circuit is deactivated while the detector and/or measurement device or means 4 are activated. The measurement step takes place as described in the embodiment illustrated.

Finally, when the phase (#5) to measure the rate of variation of water vapour is terminated, the test cycle starts the phase (#6) to finish the pressure measurement and to drain the test water circuit 5. The valve 55 is opened so that water leaving the injection chamber can be evacuated to the discharge reservoir 52, and the access valve 30 to the vacuum pump 3 is opened. The tap 58 and the valve 56 also remain open.

Note that in the case of a large leak causing a large content of liquid, valve 55 must be used to drain the liquid and then all valves must be closed; it will then be necessary to continue to create a vacuum until the required vacuum level is reached, proving that the circuit has been properly dried and that everything is ready for the next test.

It should be noted that according to one embodiment of the invention, the test liquid injection and pressurization phase could be performed during a distinct later step, before the test procedure. In this case, the hollow part is filled with liquid and sealed before the test procedure.

In other words, an embodiment alternative to that illustrated but included in the invention can include a distinct preliminary step for the injection and pressurization of test liquid, in which the part is filled with liquid and sealed in a station separate from the test station, and before the test station in the fabrication line of parts to be tested.

Typical tests results obtained using an installation like that described above using the test method described above are described below with reference to FIGS. 5 and 6.

An installation calibration phase as described above is made before starting leak measurements by measuring the variation in the test chamber.

Figure 5:
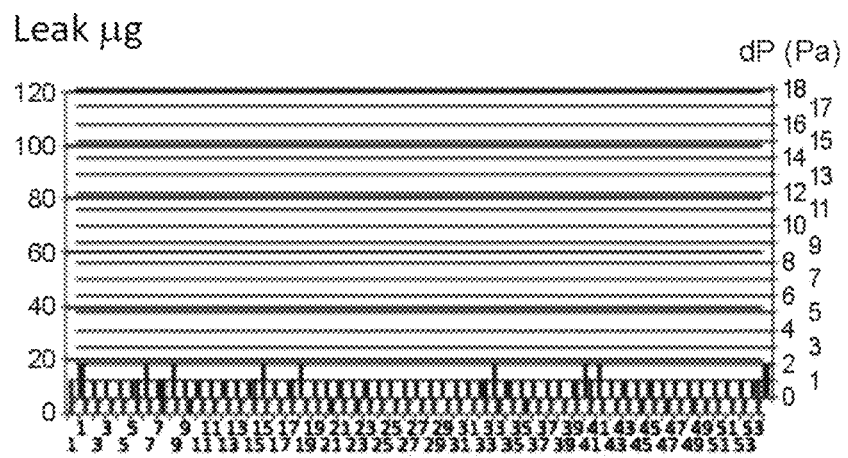
FIG. 5 is a graph presenting a series of calibration tests performed on an installation according to an example of the invention.

FIG. 5 represents typical test results obtained on dummy non-leaky calibration parts without a membrane, in the form of a diagram giving the relation between the measured pressure variation and the corresponding water leak calculated in mass per minute, for a test chamber equal to 15 cm3, under previously discussed calibration conditions.

It can be seen on this diagram that in the absence of leaks, the measured value can be close to 20 μg/min for a pressure difference of the order of 2 Pascals, which is equivalent to a residual value that can correspond to the stability limit of the measurement system.

Figure 6:
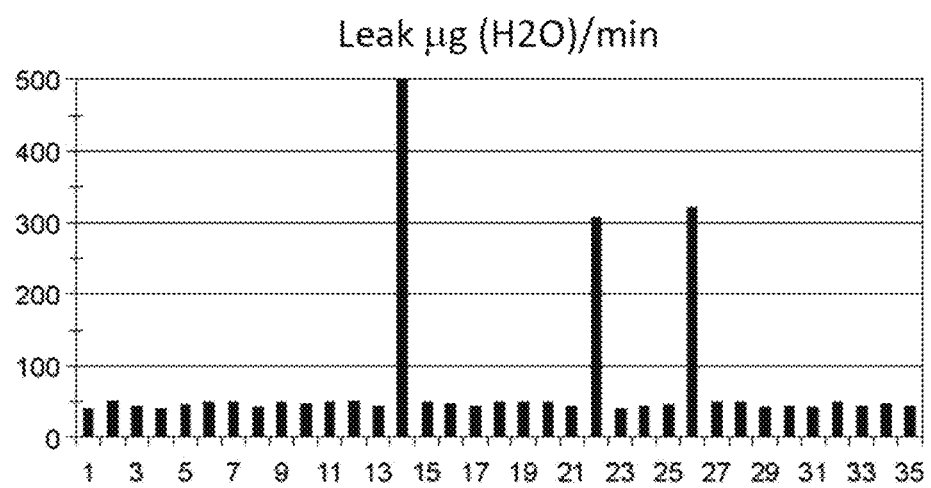
FIG. 6 is a graph presenting a series of typical leak detection and measurement tests made on a batch of hollow parts, using an installation and a method according to one example of the invention.

FIG. 6 shows typical results of tests carried out on a batch of parts, some of which actually have leaks.

In particular, as illustrated on this FIG. 6 diagram, the results for a first series of walls including test numbers 14, 22 and 26 demonstrate measured values of water leaks per minute equal to >500 μg/min, 305 μg/min and 310 μg/min. Consequently, these walls appear to include significant water leaks.

For the other tests shown in the FIG. 6 diagram, they show measured values of water leaks per minute equal to between 40 and 50 μg/min. This value corresponds to the partial pressure of water vapour escaping through the wall.

The difference between the first series and other tests is significant, and the quantification possible due to the invention, associated with a threshold determined by the operator, discriminate between parts that are and parts that are not water tight.

In this respect, even in the absence of a membrane leak, vapour will always be observed in the test chamber and the measurement will not be zero, in relation to the concept of "partial vapour pressure" discussed above with reference to FIG. 4.

The result is that an "offset" has to be taken into account in the measurements made.

Example: vacuum level=1 kPa absolute

Partial vapour pressure=2 kPa absolute

Membrane with no leak: 2 kPa of vapour at a delta P equal to 2−1=1 kPa passes through the membrane at a certain flow rate that depends on the characteristics of the membrane. This vapour flow is measured and corresponds to the offset.

Membrane with leak: in addition to the previous flow, a given water flow escapes to the other side of the membrane at a vacuum of 1 kPa, evaporates completely and is measured, therefore in addition to the previous offset.

Therefore the choice of the discrimination threshold between conforming parts and leaky parts must take account of this offset.

The invention claimed is:

1. A leak detection device for use with a wall having gas/liquid permeability, the leak detection device comprising:
   a test liquid circuit including a test liquid;
   an injection and pressurization device in communication with the test liquid circuit;
   a containment in selective fluid communication with the test liquid circuit, the wall sealingly positioned in the containment;
   an injection chamber positioned within the containment, the injection chamber in selective communication with the injection and pressurization device, the injection and pressurization device operable to selectively apply a liquid pressure to the injection chamber;
   a test chamber positioned within the containment;
   a vacuum production device in selective communication with the test chamber, the vacuum production device operable to selectively apply a vacuum pressure to the test chamber; and
   a vaporized liquid detector in communication with the test chamber, the vaporized liquid detector operable to at least one of detect or measure at least one parameter related to a quantity of liquid vapor or a variation of the quantity of liquid vapor in the test chamber, or a liquid vapor flow, the parameter indicative of a leak condition through the wall.

2. The leak detection device according to claim 1, wherein said parameter related to a quantity of test liquid vapor, or a variation of the quantity of liquid vapor in the test chamber comprises at least one of:
   a parameter detecting the presence of vaporised liquid;
   a parameter indicating the liquid vapor flow rate;
   a parameter indicating pressure variations associated with the presence of vaporised liquid; or
   a parameter indicating rates of pressure variations associated with at least one of an existence of leakage of liquid through the wall or a leakage flow rate of liquid through the wall.

3. The leak detection device according to claim 2, wherein said parameter of indicating pressure variations associated with the presence of vaporised liquid further comprises a measurement of the pressure variation; and said vaporized liquid detector further comprises a measuring device for measuring at least one of a pressure in the test chamber or a pressure variation in said test chamber.

4. The leak detection device according to claim 2, wherein said parameter of indicating the liquid vapor flow rate further comprises a measurement of the flow rate, and said vaporized liquid vapor detector further comprises a device for measuring the flow rate of liquid vapor originating from said test chamber.

5. The leak detection device according to 2, wherein the containment further comprises:
   a sealed channel in communication with the injection chamber and the test liquid circuit, said test liquid supply circuit further comprising:
   a liquid supply reservoir; and
   a filter positioned between said liquid supply reservoir and said injection chamber.

6. The leak detection device according to claim 5 further comprising: a control unit operable to test successive steps in a test procedure, the control unit further operable to control a plurality of liquid flow (F) regulation valves in communication with the test liquid circuit.

7. The leak detection device according to claim 2, wherein the vacuum production device further comprises: a vacuum pump operable to lower a pressure in the test chamber to a pressure (P2) less than a partial pressure of the liquid vapor used at the test temperature; and
   the test liquid circuit further comprises a liquid discharge reservoir.

8. The leak detection device according to claim 3, wherein said wall is a hollow part, said injection chamber defined by an inside of said hollow part, and wherein said test chamber is defined by an inside of the containment in which said hollow part is sealed.

9. The leak detection device according to claim 3, wherein said wall is a hollow part, said test chamber defined by an inside of said hollow part, and wherein said injection chamber is defined by an inside of the containment in which said hollow part is sealed.

10. The leak detection device according to claim 1, wherein said wall is a hollow part, said injection chamber defined by an inside of said hollow part, and wherein said test chamber is defined by an inside of the containment in which said hollow part is sealed.

11. The leak detection device according to claim 1, wherein said wall is a hollow part, said test chamber defined by an inside of said hollow part, and wherein said injection chamber is defined by an inside of the containment in which said hollow part is sealed.

12. The leak detection device according to 1, wherein the containment further comprises a sealed channel in communication with the injection chamber and the test liquid circuit, said test liquid supply circuit further comprising a liquid supply reservoir.

13. The leak detection device according to claim 12, wherein said test liquid circuit further comprises a filter positioned between said liquid supply reservoir and said injection chamber.

14. The leak detection device according to claim 1, wherein the vacuum production device further comprises a vacuum pump; and a liquid discharge reservoir.

15. The leak detection device according to claim 1, wherein said vacuum production device is operable to lower a pressure in the test chamber to a pressure (P2) less than a partial pressure of the liquid vapor used at the test temperature.

16. The leak detection device according claim 1, wherein said injection and pressurization device is operable to pressurise the test liquid in the injection chamber to a pressure (P1) higher than four (4) bars relative; and wherein said vacuum production device is operable to lower a pressure in the test chamber to a pressure (P2) less than 2 kPa absolute.

17. The leak detection device according to claim 1 further comprising: a control unit operable to test successive steps in a test procedure, the control unit further operable to control a plurality of liquid flow (F) regulation valves in communication with the test liquid circuit.

18. The leak detection device according to claim 1, wherein said injection and pressurization device is operable to pressurize the test liquid in the injection chamber to a pressure (P1) higher than one (1) bar relative.

19. The leak detection device according to claim 1, wherein said vacuum production device is operable to lower a pressure in the test chamber to a pressure (P2) less than 1 kPa absolute.

* * * * *